United States Patent

[11] 3,588,239

| [72] | Inventors | Roland Hochstein<br>Stuttgart, Mohringen;<br>Gerhard Borner, Musberg; Rudolf Taesler,<br>Leinfelden, Germany |
|---|---|---|
| [21] | Appl. No. | 824,760 |
| [22] | Filed | May 15, 1969 |
| [45] | Patented | June 28, 1971 |
| [73] | Assignee | Zeiss Ikon Aktiengesellschaft<br>Stuttgart, Germany |
| [32] | Priority | May 30, 1968 |
| [33] | | Germany |
| [31] | | P 17 72 527.8 |

[54] MOTION PICTURE CAMERA WITH MOVABLE HANDLE
4 Claims, 7 Drawing Figs.

[52] U.S. Cl............................................. 352/243,
16/115, 95/86
[51] Int. Cl.............................................. G03b 17/00
[50] Field of Search.................................. 352/243;
95/86; 16/110, 115

[56] References Cited
UNITED STATES PATENTS

| 2,679,196 | 5/1954 | Sochor et al.................. | 95/86X |
| 3,240,143 | 3/1966 | Koeber, Jr. et al............ | 352/243X |
| 3,242,840 | 3/1966 | Kremp et al. ................. | 352/243X |
| 3,301,627 | 1/1967 | Kimura......................... | 352/243X |
| 3,380,366 | 4/1968 | Olson .......................... | 352/243 |
| 3,437,029 | 4/1969 | Rydstedt ..................... | 95/86 |

FOREIGN PATENTS

| 195,749 | 6/1957 | Austria......................... | 95/86 |
| 1,266,818 | 12/1961 | France ........................ | 95/86 |
| 1,141,881 | 12/1962 | Germany...................... | 95/86 |
| 1,226,413 | 10/1966 | Germany...................... | 95/86 |

Primary Examiner—S. Clement Swisher
Assistant Examiner—Joseph W. Roskos
Attorney—Singer, Stern and Carlberg ABSTRACT: A motion picture camera is provided with a movable handle shell with an open side into which enters a narrow side of the camera casing when the handle is moved into its inoperative position flat against the camera. In the operative position of the handle, the same is moved to extend outwardly from the camera. In this position the thumb of the hand gripping the handle is able to operate the release member of the camera.

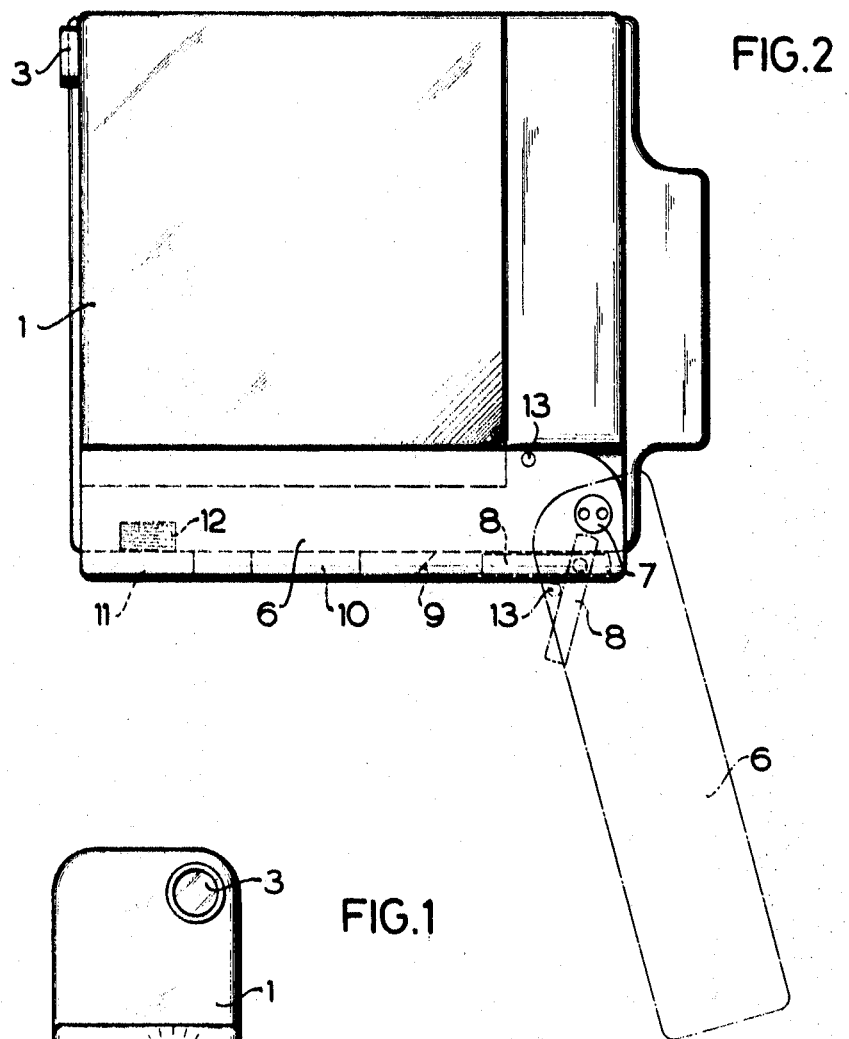
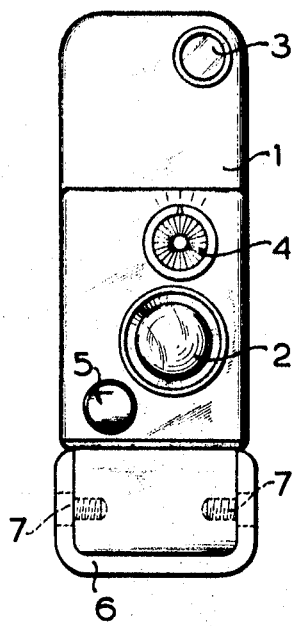
FIG. 2
FIG. 1
INVENTORS
Roland Hochstein
Gerhard Börner
Rudolf Taesler
by Singer, Stern & Carlberg
Attorneys

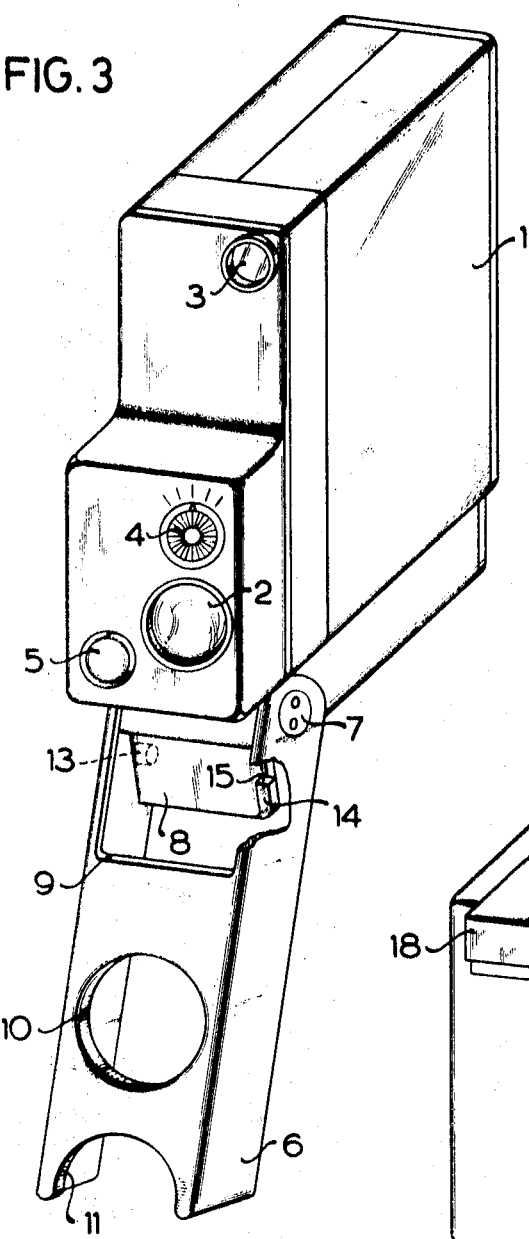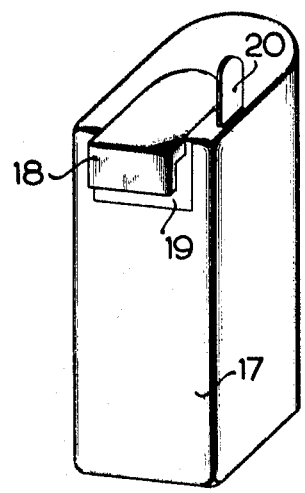

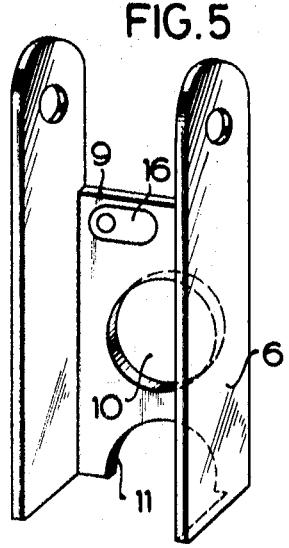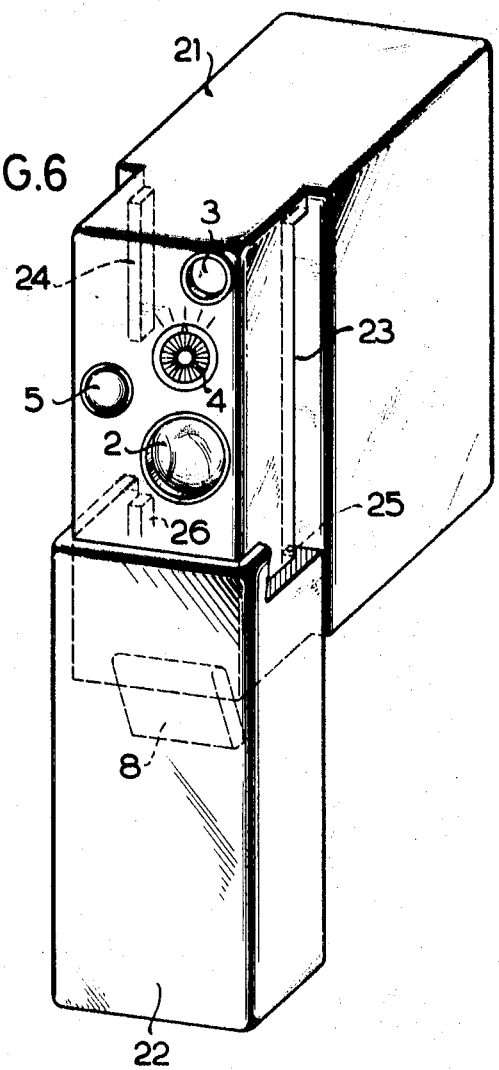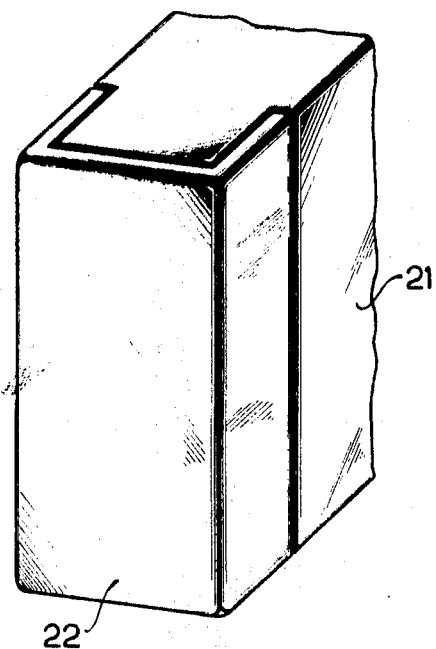

MOTION PICTURE CAMERA WITH MOVABLE HANDLE

The invention relates to a motion picture camera with a movable handle which from an inoperative position flat against the camera casing may be moved into an outwardly extending operative position.

It is an object of the invention to provide a motion picture camera with a handle which permits a convenient manipulation of the camera during the taking of pictures and has small exterior dimensions. The camera is intended, when the handle is moved into its inoperative position, to be inserted easily into the pocket of the clothing; for instance, into an overcoat pocket.

Another object of the invention is to provide the motion picture camera with a handle and with a camera release member, which latter can be operated by the same hand which holds the handle when the camera is in operative position.

Still another object of the invention is a camera whose handle is provided with relatively large gripping surfaces for a secure holding of the camera when in operative position, and to provide also the camera release member with large actuating surfaces which are easily accessible by the thumb of the hand holding the handle.

In accordance with another object of the invention, the handle comprises a shell-type member with one open side into which the camera casing is adapted to enter when the handle is moved into its inoperative position flat against the camera casing, without substantially increasing the allover size of the camera.

In order to increase the capacity of the camera the invention provides that the handle shell is adapted to receive an auxiliary container and provide the latter with electrical contacts and with additional batteries, or with other connecting means; such as a cable, so as to connect the camera drive mechanism with an exterior electrical network. At least, the auxiliary container may have such a shape that it converts the handle shell into a complete handle having gripping surfaces all around it.

Other objects of the invention will appear from the following detailed description of two embodiments of the invention with reference to the accompanying drawings in which:

FIG. 1 is a front elevation view of a motion picture camera with a handle and a release lever folded against the camera casing.

FIG. 2 is a side elevation of the motion picture camera shown in FIG. 1 in which the operative positions of the handle and release lever are shown in dash-dotted lines, FIG. 3 is a perspective view of the motion picture camera with the handle and release lever in their extended operative position, FIG. 4 is a perspective view of an auxiliary member which may be attached to the handle when the latter is in the extended position;

FIG. 5 is a perspective view of the handle when removed from the camera,

FIG. 6 illustrates in a perspective view another embodiment of the novel connection between the camera casing and the handle, and FIG. 7 is a perspective view of the structure shown in FIG. 6, but with the handle in an inoperative position.

The FIGS. 1 to 5 of the drawings illustrate one of the two described embodiments of the invention. The camera casing 1 is provided with an objective 2, a finder 3, a film speed setting mechanism 4, an exposure mechanism 5, and a handle shell 6, which is pivotally attached with one of its two ends by means of two oppositely disposed bearing screws 7 to the front end of the lower narrow wall of the camera casing 1. The handle shell is open towards its rear. Within the hollow space of the handle enters a portion of the camera casing when the handle is folded against it, so that the thickness of the entire camera at this region is increased only about double the thickness of the wall thickness of the handle shell 6. Within the hollow space of the handle is also arranged a camera release lever, or flap 8 attached to the camera casing. This flap extends into the range of the thumb of the hand of the camera user with which the latter holds the handle. Adjacent its pivot axis the handle 6 is provided with a square recess 9 so that the camera release lever 8 is also then freely accessible when the handle shell 6 has been folded against the lower narrow wall of the camera casing 1. Below the recess 9, the handle shell 6 is provided with a circular aperture 10, which assists in carrying the camera when the camera is in operative position ready to take pictures, in which the handle 6 is in the position shown in FIG. 3. In this aperture 10, a finger of the hand holding the camera may be inserted. A semicircular recess 11 at the outer free end of the handle shell 6 exposes a tripod thread 12 in the bottom wall of the camera, when the handle shell 6 has been folded against the camera casing. From one of the sidewalls of the handle shell 6 a pin or similar projection 13 extends inwardly, namely, into the range of movement of the pivotally mounted camera release lever 8. This camera release lever 8 is subject to the action of a nonillustrated spring which attempts to urge the camera release lever 8 always into a horizontal rest position illustrated in dash lines in FIG. 2. In the opposite side of the release lever 8, which faces away from the projection 13 is embedded a contact piece 14, which by means of an electrical conductor line 15 is connected with the camera driving mechanism such as an electric motor driven mechanism. In the interior of the handle shell 6 is arranged a contact strip 16. (FIG. 5).

FIG. 4 illustrates an auxiliary container 17, which is so shaped that when it is inserted into the handle shell 6, a complete handle having relatively large gripping surfaces is formed. A hook-shaped member 18 engages the recess 9 to hang over the bottom edge thereof and when this occurs, a contact surface 19 on the container 17 engages the contact strip 16 in the handle shell 6 and this completes an electrical connection. In this manner, there is established a conductive connection between the auxiliary container 17 with the camera casing 1 via the handle 6. At the upper end of the auxiliary container 17, a contact strip 20 extends upwardly which comes to lie within the range of movement of the contact piece 14 on the camera release lever 8.

When the handle shell 6 is pivotally moved from the inoperative position shown in FIGS. 1 and 2 into the extended operative position as shown in dash-dotted lines in FIG. 2 and in solid lines in FIG. 3, then the projection 13 engages the camera release lever 8 and moves the latter from its rest position, in which it engages the camera casing 1, into the operative position; namely, into a position in which the camera is ready for release or operation.

The camera is now ready to take pictures and the camera release lever 8 can be operated by the thumb of the hand of the camera user which holds the handle shell 6. It is obvious that in this manner the camera can very easily and safely be operated.

If one desires to transport the camera with the handle shell and also with the camera release lever 8 ready for immediate operation then it is solely necessary to insert a finger into the aperture 10 of the handle shell 6. The camera is small and in this manner can easily be carried for a longer period of time.

When the motion camera exposes a number of films one after the other, it may happen that the batteries arranged in the camera casing 1 do not have the sufficient capacity to operate the camera driving mechanism for this extended period of time. When this happens, then it is possible to attach the auxiliary container 17 to the handle shell 6. Whenever thereafter the camera release lever 8 is actuated, then the contact piece 14 engages the contact strip 20 and thereby additional batteries arranged in the auxiliary container 17 will be electrically connected with the camera driving mechanism.

Obviously, it is also possible to arrange other electrical structural elements in the auxiliary container 17, which permit the operation of the camera drive mechanism by a conventional electric network.

In order to carry the camera from one place to another, the auxiliary container 17 is removed from the handle shell 6 so that the latter can be pivoted or folded against the lower narrow bottom wall of the camera casing 1. Since with the handle shell 6, the projection 13 also returns to its rest or inoperative position, the camera release lever 8 can now be folded against the narrow bottom wall of the camera casing 1 by means of the spring acting upon it. The release lever 8 remains, however, readily accessible; namely, it is exposed by the recess 9 which is arranged in the handle shell 6 and, therefore, the camera may also be operated when the handle shell 6 is folded against the lower wall of the camera casing 1. The camera operator has only to grasp the release lever 8 and pivots it first of all into its position ready to be release for camera operation. AFter this, he can readily operate the release lever 8 in order to operate the camera drive mechanism when he desires to take pictures. If he, however, subsequently disengages the release lever 8, then the latter returns automatically into its operative position folded against the lower narrow wall of the camera casing 1.

In the other embodiment of the invention, which is illustrated in the FIGS. 6 and 7, a handle shell 22 is connected with the camera casing 21 by means of a slidable rail connection. This slidable rail connection consists of two spaced parallel and vertically arranged guide rails 23 and 24 arranged to extend along the vertical sidewalls of the camera casing in close proximity to the narrow front wall thereof. The handle shell 22 is vertically movable along these rails 23 and 24 and is provided with inwardly extending ribs 25 and 26, which engage these rails 23 and 24.

The slidable movement of the handle shell 22 with respect to the camera casing 21 is limited by stops which are not particularly illustrated in the drawing. FIG. 6 illustrates the operative position of the camera in which the handle shell 22 has been moved downwardly to its lowermost position in which it is arrested by stops. In this position, the objective 2, the finder 3, the film speed setting mechanism 4, and the light admitting aperture for the exposure control device 5 are exposed. The camera release lever 8 corresponds to the camera release lever, as shown in connection with the FIGS. 1 to 5, and in the operative position of the camera is disposed in the interior of the handle shell 22.

In order to insert the camera into a pocket, the handle shell 22 is moved upwardly into its uppermost position in which the handle completely covers the narrow front wall of the camera casing 21, as shown in FIG. 7.

We claim:

1. A motion picture camera whose casing has mounted thereon a movable handle having the shape of an open shell which in its inoperative position embraces a narrow portion of said casing along its entire side and in its operative position extends outwardly from one corner of said casing, the total thickness of said casing in the inoperative position of the camera being increased only about the double wall thickness of said shell, wherein the improvement comprises a release lever (8) pivotally mounted on said casing and which from its operative position is adapted to be pivotally moved into an inoperative position folded flatly against that portion of said casing embraceable by said handle (6), said handle having an aperture to permit said release lever to be folded against said casing and to permit free access to said release lever for moving it to and from operative position, said release lever having a thickness substantially equal to the wall thickness of said handle.

2. A motion picture camera according to claim 1, in which said handle is pivotally attached to one corner of said casing, means for pivotally attaching said release lever to said casing adjacent the point where said handle is attached to said casing, and a pin on said handle for engaging said release lever to move it from its inoperative position to its operative position when said handle is moved to its operative extended position.

3. A motion picture camera according to claim 1, including means on said handle for engaging said camera release member and permitting a relative motion between the same, so that said camera release member may be operated when said handle is moved flat against the camera casing.

4. A motion picture camera according to claim 1, including means for pivotally attaching one end of said handle to the lower front end of the camera casing.